United States Patent
Miyaji

(10) Patent No.: US 6,212,277 B1
(45) Date of Patent: Apr. 3, 2001

(54) ELLIPTIC CURVE TRANSFORMATION DEVICE, UTILIZATION DEVICE AND UTILIZATION SYSTEM

(75) Inventor: Atsuko Miyaji, Ishikawa-ken (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/262,794

(22) Filed: Mar. 4, 1999

(30) Foreign Application Priority Data

Mar. 5, 1998 (JP) .................................................. 10-053204

(51) Int. Cl.[7] ....................................................... H04K 1/00
(52) U.S. Cl. .................................................. 380/30; 380/28
(58) Field of Search .......................................... 380/28, 30

(56) References Cited

U.S. PATENT DOCUMENTS 5,737,424 * 4/1998 Elteto ...................................... 380/28

OTHER PUBLICATIONS

"Elliptic Curve Cryptosystems and Their Implementations," by Menezes et al., Journal of Cryptology, vol. 6, p. 4, 1993.
"Efficient Elliptic Curve Exponentiation," by A. Miyaji et al., Information and Communications Security, First International Conference, Nov. 11–14, 1997.
Yongfei Han et al., Information and Communications Security, First International Conference, ICICS/97 Beijing, China, Nov. 1997 Proceedings, Lecture Notes in Computer Science—1334.

* cited by examiner

Primary Examiner—Gail Hayes
Assistant Examiner—James Seal
(74) Attorney, Agent, or Firm—Price and Gess

(57) ABSTRACT

A parameter receiving unit receives parameters $\alpha$ and $\beta$ of an elliptic curve E and an element $G=(x0,y0)$ on the elliptic curve E. A transformation coefficient acquiring unit calculates a transformation coefficient t which is an element on a finite field GF(p) so that $t^4 \times \alpha \pmod{p}$ will not exceed 32 bits. A transformed elliptic curve calculating unit calculates parameters $\alpha'$ and $\beta'$ of an elliptic curve Et that is defined over the finite field GF(p) and expressed as Et: $y'^2 = x'^3 + \alpha' \times x' + \beta'$, and calculates an element $Gt=(xt0,yt0)$ that is present on the elliptic curve Et and corresponds to the element G, as follows:

$\alpha' = \alpha' t^4$
$\beta' = \beta \times t^6$
$xt0 = t^2 \times x0$
$yt0 = t^3 \times y0$ A parameter sending unit sends the parameters $\alpha'$ and $\beta'$ and the element Gt to an external device.

16 Claims, 7 Drawing Sheets

FIG. 3

| i | T(i) |
|---|---|
| 0 | −3 |
| 1 | 1 |
| 2 | −1 |
| 3 | 2 |
| 4 | −2 |
| 5 | 4 |
| 6 | −4 |
| 7 | 5 |
| 8 | −5 |
| 9 | 6 |
| 10 | −6 |
| ⋮ | ⋮ |

ELLIPTIC CURVE TRANSFORMATION DEVICE, UTILIZATION DEVICE AND UTILIZATION SYSTEM

This application is based on an application No. 10-053204 filed in Japan, the content of which is hereby incorporated by reference.

BACKGROUND OF THE INVENTION

1. Field of the Invention

The present invention relates to an encryption technique for maintaining the security of information, and in particular relates to an encryption/decryption technique, a digital signature/verification technique, and a key agreement technique which use an elliptic curve.

2. Description of the Related Art

<Public-Key Encryption>

Data communication that uses computer and communication techniques has become pervasive in recent years. Secret communication or digital signature techniques are used in such data communication. Secret communication techniques allow communication to be performed without the communicated content being revealed to third parties. Digital signature techniques, meanwhile, enable a receiver to verify whether the communicated content is valid or whether the information is from the stated sender.

Such secret communication or digital signature techniques use a cryptosystem called public-key encryption. Public-key encryption provides a convenient method for managing the separate encryption keys of many users, and so has become a fundamental technique for performing communication with a large number of users. In secret communication based on public-key encryption, different keys are used for encryption and decryption, with the decryption key being kept secret and the encryption key being made public.

Here, one of the founding principles for the security of public-key encryption is the so-called "discrete logarithm problem". Representative examples of the discrete logarithm problem are problems defined over finite fields and problems based on elliptic curves. Such problems are described in detail in Neal Koblitz, *A Course in Number Theory and Cryptography* (Springer-Verlag, 1987).

<Discrete Logarithm Problem based on Elliptic Curve>

A discrete logarithm problem based on an elliptic curve is as follows.

$E(GF(p))$ is the elliptic curve E defined over the finite field $GF(p)$, with an element G, given when the order of E is exactly divided by a large prime number, being set as a base point. This being so, the problem is to calculate an integer x that satisfies $$Y=x*G \quad \text{(Formula 1)}$$

where Y is a given element on the elliptic curve E and such an integer x actually exists.

Here, p is a prime number and $GF(p)$ is a finite field that includes p elements. Note that in this specification the sign * represents exponentiation of an element included in an elliptic curve, so that $x*G=G+G+\ldots+G$ where the element G is cumulated x times.

The reason a discrete logarithm problem assists in the security of public-key encryption is that the above calculation of x is extremely difficult for a large finite field $GF(p)$.

<ElGamal Signature Scheme Which Uses Discrete Logarithm Problem Based on Elliptic Curve>

The following is a description of the ElGamal signature scheme which uses a discrete logarithm problem based on an elliptic curve.

FIG. 1 is a sequence diagram showing the digital signature procedure by the ElGamal signature scheme.

A user A 110, a management center 120 and a user B 130 are connected together via a network.

First, a prime number is set as p, an elliptic curve over a finite field $GF(p)$ is set as E, a base point of E is set as G, and the order of E is set as q. Which is to say, q is the smallest positive integer that satisfies $$q*G=0 \quad \text{(Formula 2)}$$

Note that a point $(\infty,\infty)$ whose x and y coordinates are both $\infty$ is called "point at infinity" and expressed as 0. When an elliptic curve is regarded as a group, 0 acts as "zero-element" in addition operations.

(1) Generation of Public Key by Management Center 120

Using a secret key xA given by the user A 110 beforehand, the management center 120 generates a public key YA for the user A 110 according to Formula 3 (steps S141–S142).

$$YA=XA*G \quad \text{(Formula 3)}$$

The management center 120 then announces the prime number p, the elliptic curve E and the base point G as system parameters, and reveals the public key YA of the user A 110 to the user B 130 (steps S143–S144).

(2) Generation of Signature by User A 110

The user A 110 generates a random number k (step S145). The user A 110 then calculates $$R1=(rx,ry)=k*G \quad \text{(Formula 4)}$$

(step S146), and finds s that satisfies $$s \times k = m + rx \times xA \pmod{q} \quad \text{(Formula 5)}$$

(step 147), where m denotes a message to be sent from the user A 110 to the user B 130.

The user A 110 sends (R1,s) as a signature to the user B 130 together with the message m (step S148).

(3) Verification of Signature by User B 130

The user B 130 verifies the validity of the user A 110 that is the sender of the message m, by judging whether Formula 6 is satisfied (step S149).

$$s*R1=m*G+rx*YA \quad \text{(Formula 6)}$$

Here, Formula 6 derives from $$\begin{aligned}s*Ri &= \{((m+rx\times xA)/k)\times k\}*G \quad \text{(Formula 7)} \\ &= (m+rx\times xA)*G \\ &= m*G+(rx\times xA)*G \\ &= m*G+rx*YA\end{aligned}$$

<Computational Complexity of Addition and Doubling in Elliptic Curve Exponentiation>

In the above ElGamal digital signature scheme which uses a discrete logarithm problem based on an elliptic curve, elliptic curve exponentiation is repeatedly performed to generate the public key and the signature and to verify the signature. For example, xA*G in Formula 3, k*G in Formula 4, s*R1, m*G and rx*YA in Formula 6 are such elliptic curve exponentiation. For details on elliptic curve exponentiation, see "Efficient Elliptic Curve Exponentiation" in Miyaji, Ono & Cohen, *Advances in Cryptology-Proceedings of ICICS'97, Lecture Notes in Computer Science,* pp.282–290 (Springer-Verlag, 1997).

Formulas used in elliptic curve exponentiation will be explained below.

Let $$y^2=x^3+\alpha x+\beta$$

be the equation of an elliptic curve. In this specification, the sign represents a repeated multiplication, so that $2^3 = 2\times 2\times 2$.

Let $P=(x1,y1)$ and $Q=(x2,y2)$ be two arbitrary points on the elliptic curve and $R=(x3,y3)$ be a point defined by $R=P+Q$.

When $P\neq Q$, $R=P+Q$ is an addition operation using addition formulas that are $$x3=\{(y2-y1)/(x2-x1)\}^2-x1-x2$$

$$y3=\{(y2-y1)/(x2-x1)\}(x1-x3)-y1$$

When $P=Q$, on the other hand, $R=P+Q=P+P=2\times P$, so that $R=P+Q$ is a doubling operation using doubling formulas that are $$x3=\{(3\times 1^2+\alpha)/2y1\}2-2\times 1$$

$$y3=\{(3\times 1^2+\alpha)/2y1\}(x1-x3)-y1$$

Note that the above operations are performed on a finite field where the elliptic curve is defined.

As shown in the addition formulas, when performing the addition operation over the elliptic curve in the 2-tuple coordinates called affine coordinates, it is necessary to perform one division over the finite field. One division over a finite field requires an average of 10 times as much computational complexity as one multiplication over the finite field.

To reduce this computational complexity, 3-tuple coordinates called projective coordinates are used instead.

Projective coordinates are 3-tuple coordinates made up of X, Y, and Z, wherein if a number n and two points (X,Y,Z) and (X',Y',Z') satisfy the relationship $$X'=nX,\ Y'=nY,\ Z'=nZ$$

then $$(X,Y,Z)=(X',Y',Z')$$

Projective coordinates (X,Y,Z) correspond to affine coordinates (x,y) as follows:

$$(x,y)\rightarrow(x,y,1)$$

$$(X,Y,Z)\rightarrow(X/Y,Y/Z)\ (\text{where } Z\neq 0)$$

Here, the sign → is used in such a way that S1→S2 when an element in a set S1 corresponds to an element in a set S2.

Hence the following description will be made on the premise that all computations over elliptic curves are performed in projective coordinates.

Addition and doubling formulas used for an elliptic curve in projective coordinates will be explained below. These formulas are consistent with the addition and doubling formulas in affine coordinates given above.

Elliptic curve exponentiation is achieved by repeating additions and doublings. Here, while computational complexity of an addition is unchanged regardless of parameters in an elliptic curve, computational complexity of a doubling is dependent on the parameters in the elliptic curve.

Let p be a 160-bit prime number and E: $y^2=x^3+\alpha x+\beta$ be an elliptic curve over a finite field GF(p).

When elements P and Q on the elliptic curve E are set respectively as $P=(X1,Y1,Z1)$ and $Q=(X2,Y2,Z2)$, $R=(X3,Y3,Z3)=P+Q$ is calculated as follows.

(1) Addition (where $P\neq Q$)
(1-1) Calculation of Intermediate Values
The following is calculated.

$$U1=X1\times Z2^2 \quad \text{(Formula 8)}$$

$$U2=X2\times Z1^2 \quad \text{(Formula 9)}$$

$$S1=Y1\times Z2^3 \quad \text{(Formula 10)}$$

$$S2=Y2\times Z1^3 \quad \text{(Formula 11)}$$

$$H=U2-U1 \quad \text{(Formula 12)}$$

$$r=S2-S1 \quad \text{(Formula 13)}$$

(1-2) Calculation of $R=(X3,Y3,Z3)$
The following is calculated.

$$X3=-H^3-2\times U1\times H^2+r^2 \quad \text{(Formula 14)}$$

$$Y3=-S1\times H^3+r\times(U1\times H^2-X3) \quad \text{(Formula 15)}$$

$$Z3=Z1\times Z2\times H \quad \text{(Formula 16)}$$

(2) Doubling (where P=Q (R=2P))
(2-1) Calculation of Intermediate Values
The following is calculated.

$$S=4\times X1\times Y1^2 \quad \text{(Formula 17)}$$

$$M=3\times X1^2+\alpha\times Z1^4 \quad \text{(Formula 18)}$$

$$T=-2\times S+M^2 \quad \text{(Formula 19)}$$

(2-2) Calculation of $R=(X3,Y3,Z3)$
The following is calculated.

$$X3=T \quad \text{(Formula 20)}$$

$$Y3=-8\times Y1^4+M\times(S-T) \quad \text{(Formula 21)}$$

$$Z3=2\times Y1\times Z1 \quad \text{(Formula 22)}$$

Computational complexity when performing the above addition and doubling over the elliptic curve E can be estimated as follows. Here, computational complexity of one multiplication over the finite field GF(p) is measured as 1 Mul, while computational complexity of one squaring over the finite field GF(p) is measured as 1 Sq (1 Sq≈0.8 Mul in general-purpose microprocessors).

Computational complexity of the addition over the elliptic curve E (where $P\neq Q$) is obtained by counting the number of multiplications and the number of squarings performed in Formulas 8–16. Since 1 Mul+1 Sq, 1 Mul+1 Sq, 2 Mul, 2 Mul, 2 Mul+2 Sq, 2 Mul, and 2 Mul are performed respectively in Formulas 8, 9, 10, 11, 14, 15, and 16, the computational complexity of the addition is 12 Mul+4 Sq.

Similarly, computational complexity of the doubling over the elliptic curve E (where P=Q) is obtained by counting the number of multiplications and the number of squarings performed in Formulas 17–22. Since 1 Mul+1 Sq, 1 Mul+3Sq, 1 Sq, 1 Mul+1 Sq, and 1 Mul are performed respectively in Formulas 17, 18, 19, 21, and 22, the computational complexity of the doubling is 4 Mul+6 Sq.

It should be noted that there are certain rules in counting the number of multiplications and the number of squarings. For instance, H^3 in Formula 14 can be expanded as H^3=H^2×H, so that computational complexity of H^3 is 1 Mul+1 Sq. In the same way, Z1^4 in Formula 18 can be expanded as Z1^4=(Z1^2)^2, so that computational complexity of Z1^4 is 2 Sq.

Also, H^2 in Formula 14 is not included in the number of squarings, since H^2 has already been calculated in the calculation of H^3 in the same formula.

Also, a multiplication of a given value by a small value is not included in the number of multiplications due to the following reason.

Small values noted here are small fixed values, such as 2, 3, 4, and 8, that are used for multiplications in Formulas 8–22. Such values can each be expressed in binary with 4 bits at the maximum, while the other parameters in the formulas are mostly 160 bits long.

In microprocessors, a multiplication of a multiplicand by a multiplier is normally achieved by repeatedly shifting the multiplicand and calculating the sum. More specifically, when a bit of a multiplier expressed in binary shows "1", a multiplicand expressed in binary is shifted to justify the least significant bit of the multiplicand to the position of the bit of the multiplier, thereby generating one bit string. After repeating the above shift for every bit of the multiplier, one or more bit strings are generated and totaled.

When a multiplier and a multiplicand are both 160 bits long, the 160-bit multiplicand is shifted 160 times, and as a result 160 bit strings are obtained and totaled. On the other hand, when a multiplier is 4 bits long and a multiplicand is 160 bits long, the 160-bit multiplicand is shifted 4 times, and as a result 4 bit strings are obtained and totaled.

Thus, in a multiplication of a given value by a small value, shift does not have to be repeated many times, so that computational complexity of the multiplication can be neglected. Accordingly, such a multiplication is not counted in the number of multiplications.

This rule can be applied to the following case. If a small value is assigned to the parameter a of the elliptic curve E in Formula 18 in the doubling operation, the computational complexity of the doubling can be reduced by 1 Mul to be 3Mul+6Sq. Meanwhile, the computational complexity of the addition operation is unchanged even if parameters of the elliptic curve are changed.

<Selection of Elliptic Curve Suitable for Encryption>

A method of selecting an elliptic curve suitable for use in encryption will be explained below. For details on the method, see IEEE P1363 Working Draft (IEEE, Feb. 6, 1997).

An elliptic curve suitable for encryption can be obtained by repeating the following steps.

(1) Selection of Arbitrary Elliptic Curve

First, two parameters on a finite field GF(p) are arbitrarily selected and set as $\alpha$ and $\beta$. Here, $\alpha$ and $\beta$ satisfy $$4 \times \alpha 3 + 27 \times \beta 2 \not\approx 0 \pmod{p} \quad \text{(Formula 23)}$$

and p denotes a prime number.

Next, $\alpha$ and $\beta$ are used to set an elliptic curve E that is $$E: y^2 = x^3 + \alpha \times x + \beta$$

(2) Judgement on Whether Elliptic Curve E is Suitable for Encryption

The number of elements #E(GF(p)) in the elliptic curve E obtained in (1) is calculated, and the elliptic curve E is adopted when Conditions 1 and 2 are met.

(Condition 1) #E(GF(p)) is exactly divisible by a large prime number (Condition 2) #E(GF(p))−(p+1)≉0, −1

When any of Conditions 1 and 2 is not met, the elliptic curve E is rejected and (1) and (2) are performed again where a new elliptic curve is arbitrarily selected and its suitability is judged.

<Problems of Conventional Techniques>

As described above, when a fixed small value is assigned to the parameter $\alpha$ of the elliptic curve, computational complexity of elliptic curve exponentiation can be reduced. However, it is difficult to select a secure elliptic curve that is suitable for use in encryption, since the value of the parameter $\alpha$ is fixed beforehand.

On the other hand, when the above selection method is used, a secure elliptic curve suitable for use in encryption can be selected. However, it is difficult to reduce computational complexity, since a small value may not necessarily assigned to the parameter $\alpha$ of the elliptic curve.

Thus, with the conventional techniques, it is impossible to select a secure elliptic curve suitable for encryption and at the same time reduce computational complexity for the elliptic curve, due to the above mutually contradictory problems.

SUMMARY OF THE INVENTION

The first object of the present invention is to provide an elliptic curve transformation device, an elliptic curve transformation method, and a storage medium storing an elliptic curve transformation program that solve the stated problems by converting an elliptic curve, arbitrarily selected as a secure elliptic curve suitable for use in encryption, into an elliptic curve which enables reduction in computational complexity while maintaining the same level of security.

The second object of the present invention is to provide utilization devices, such as an encryption device, a decryption device, a digital signature device, a digital signature verification device and a key agreement device, that can perform computations safely at high speed as a result of elliptic curve transformation, and a utilization system composed of the elliptic curve transformation device and any of the utilization devices.

The above objects can be fulfilled by an elliptic curve transformation device for transforming an elliptic curve E into an elliptic curve Et, the elliptic curve E being expressed as $$y^2 = x^3 + \alpha \times x + \beta$$

and defined over a finite field GF(p), p being a prime number, $\alpha$ being a parameter of the elliptic curve E, and $\beta$ being a parameter of the elliptic curve E, the elliptic curve transformation device including: a receiving unit for receiving an element G as a base point, the prime number p, the parameter $\alpha$, and the parameter $\beta$ from an external device, the element G existing on the elliptic curve E and being expressed as G=(x0,y0); a transformation coefficient acquiring unit for acquiring a transformation coefficient t that is present on the finite field GF(p), where t≉0 and a number of digits of t^4×$\alpha$(mod p) is smaller than a number of digits of the prime number p; an elliptic curve calculating unit for calculating a parameter $\alpha'$ and a parameter $\beta$ of the elliptic curve Et and an element Gt that is a new base point and is expressed as Gt=(xt0,yt0), using the transformation coefficient t according to $$\alpha' = \alpha \times t^4$$

$$\beta' = \beta \times t^6$$

$$xt0 = t^2 \times x0$$

$$yt0 = t^3 \times y0$$

where the elliptic curve Et is expressed as $$y'^2 = x'^3 + \alpha x x' + \beta'$$

and defined over the finite field GF(p); and an outputting unit for outputting the parameter $\alpha'$, the parameter $\beta'$ and the element Gt to the external device.

With this construction, it is possible to obtain a highly effective elliptic curve that has the same level of security as an arbitrarily formed elliptic curve and at the same time enables an elliptic curve utilization device to perform computations at high speed.

Here, the prime number p may be 160 bits long, wherein the transformation coefficient acquiring unit acquires the transformation coefficient t which satisfies a condition that $t^4 \times \alpha \pmod p$ is no longer than 32 bits.

With this construction, when an elliptic curve generated by the elliptic curve transformation device is used by a utilization device, computational complexity of a doubling on the elliptic curve can be reduced by 1 Mul compared to a pre-transformed elliptic curve whose parameter $\alpha$ is nearly 160 bits long.

Here, the transformation coefficient acquiring unit may acquire the transformation coefficient t which satisfies $t^4 \times \alpha \pmod p = -3$.

With this construction, when an elliptic curve generated by the elliptic curve transformation device is used by a utilization device, computational complexity of a doubling on the elliptic curve can be reduced by 2 Sq compared to conventional techniques.

The above objects can also be fulfilled by an elliptic curve utilization system whereby an elliptic curve transformation device transforms an elliptic curve E into an elliptic curve Et and a utilization device uses the elliptic curve Et generated by the elliptic curve transformation device, the elliptic curve E being expressed as $$y^2 = x^3 + \alpha x x + \beta$$

and defined over a finite field GF(p), p being a prime number, $\alpha$ being a parameter of the elliptic curve E, and $\beta$ being a parameter of the elliptic curve E, wherein the utilization device includes a first outputting unit, a first receiving unit and a utilizing unit, while the elliptic curve transformation device includes a second receiving unit, a transformation coefficient acquiring unit, an elliptic curve calculating unit and a second outputting unit, wherein the first outputting unit outputs an element G as a base point, the prime number p, the parameter $\alpha$ and the parameter $\beta$ to the elliptic curve transformation device, the element G existing on the elliptic curve E and being expressed as G=(x0,y0), wherein the second receiving unit receives the prime number p, the parameter Cr, the parameter $\beta$ and the element G from the utilization device, wherein the transformation coefficient acquiring unit acquires a transformation coefficient t that is present on the finite field GF(p), where t≠0 and a number of digits of t $4 \times \alpha \pmod p$ is smaller than a number of digits of the prime number p, wherein the elliptic curve calculating unit calculates a parameter $\alpha'$ and a parameter $\beta$ of the elliptic curve Et and an element Gt that is a new base point and is expressed as Gt=(xt0,yt0), using the transformation coefficient t according to $$\alpha' = \alpha \times t^4$$

$$\beta' = \beta \times t^6$$

$$xt0 = t^2 \times x0$$

$$yt0 = t^3 \times y0$$

where the elliptic curve Et is expressed as $$y'^2 = x'^3 + \alpha' x x' + \beta'$$

and defined over the finite field GF(p), wherein the second outputting unit outputs the parameter $\alpha'$, the parameter $\beta'$ and the element Gt to the utilization device, wherein the first receiving unit receives the parameter $\alpha'$, the parameter $\beta'$ and the element Gt from the elliptic curve transformation device, and wherein the utilizing unit performs one of encryption, decryption, digital signature, digital signature verification, and key agreement using a discrete logarithm problem as a basis for security, by performing calculations on the elliptic curve Et using the prime number p, the elliptic curve Et defined by the parameter $\alpha'$ and the parameter $\beta'$ over the finite field GF(p), and the element Gt as the base point.

With this construction, it is possible to use a highly effective elliptic curve that has the same level of security as an arbitrarily formed elliptic curve and at the same time enables high-speed computations.

Here, the prime number p may be 160 bits long, wherein the transformation coefficient acquiring unit acquires the transformation coefficient t which satisfies a condition that $t^4 \times \alpha \pmod p$ is no longer than 32 bits.

With this construction, the utilization device uses a transformed elliptic curve, so that computational complexity of a doubling can be reduced by 1 Mul compared to a pre-transformed elliptic curve whose parameter a is nearly 160 bits long.

Here, the transformation coefficient acquiring unit may acquire the transformation coefficient t which satisfies $t^4 \times \alpha \pmod p = -3$.

With this construction, the utilization device uses a transformed elliptic curve, so that computational complexity of a doubling can be reduced by 2Sq compared to conventional techniques.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 3 shows a table showing a function T(i) used in the elliptic curve transformation device;

DESCRIPTION OF THE PREFERRED EMBODIMENT(S)

The following is a description of an elliptic curve transformation device of an embodiment of the present invention with reference to figures.

1. Construction of Elliptic Curve Transformation Device 200

Figure 1:
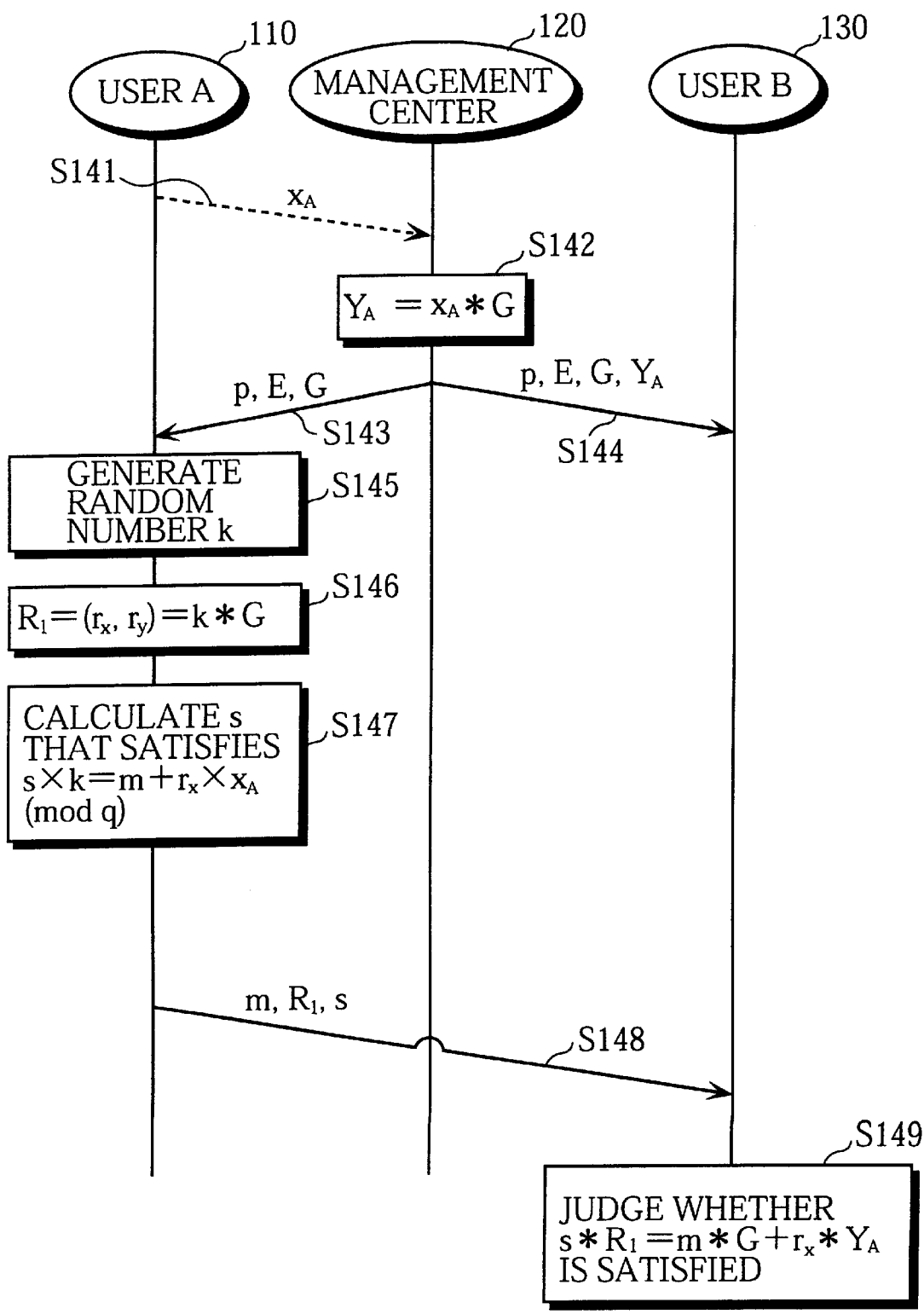
FIG. 1 is a sequence diagram showing the digital signature procedure by the ElGamal signature scheme.
Figure 2:
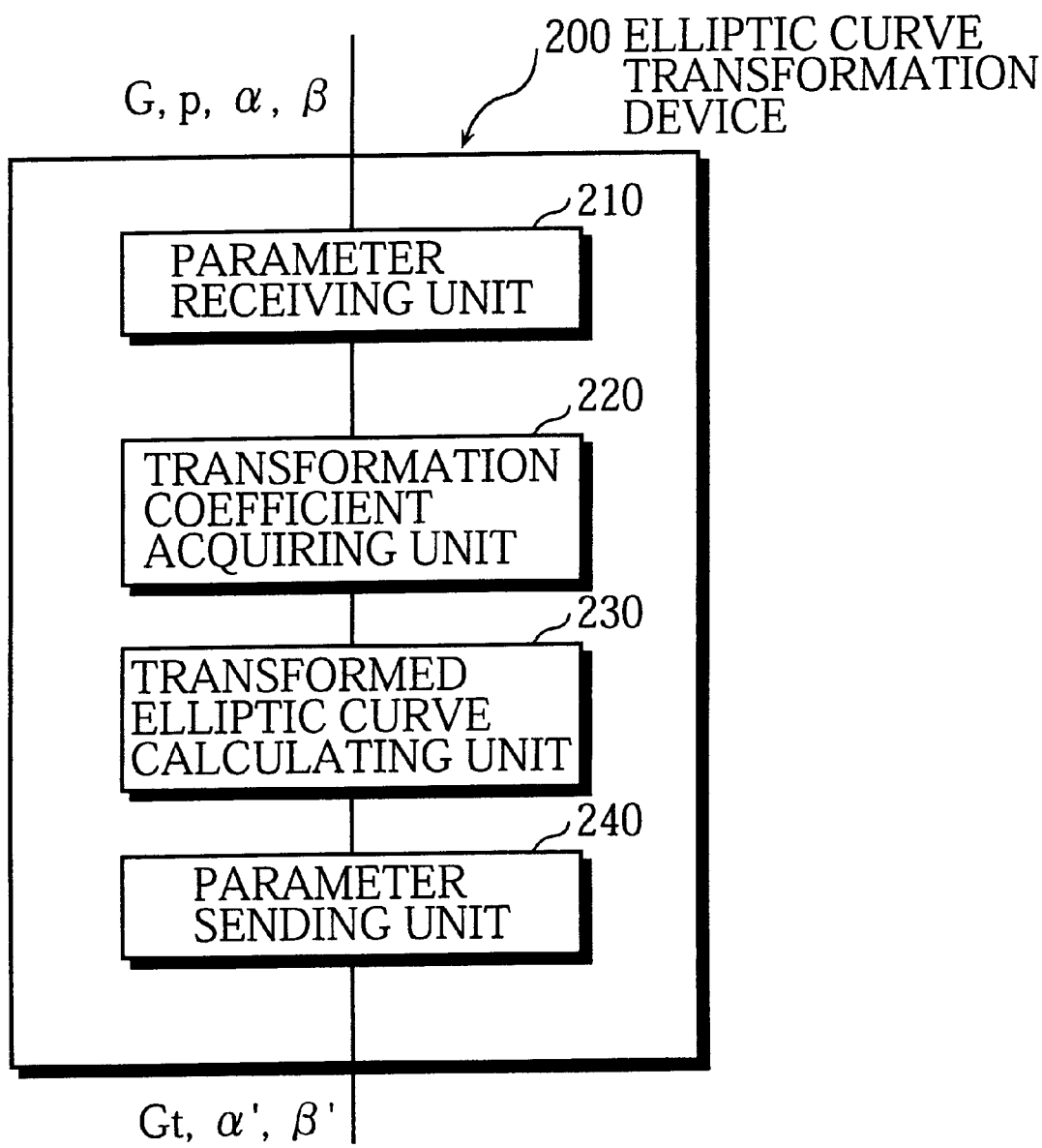
FIG. 2 is a block diagram showing an elliptic curve transformation device of an embodiment of the present invention.

As shown in FIG. 2, an elliptic curve transformation device 200 includes a parameter receiving unit 210, a transformation coefficient acquiring unit 220, a transformed elliptic curve calculating unit 230 and a parameter sending unit 240.

<Parameter Receiving Unit 210>

The parameter receiving unit 210 receives parameters α and β of an elliptic curve E, an element G on the elliptic curve E, and a prime number p from an external device. In this embodiment, p is 160 bits long.

The external device noted here may be one of an encryption device, a decryption device, a digital signature device, a digital signature verification device, and a key agreement device that use public-key encryption, and uses a discrete logarithm problem based on an elliptic curve as one of the founding principles for the security of public-key encryption. The elliptic curve E is stored in this external device.

The elliptic curve E is arbitrarily formed over a finite field GF(p) and expressed as $$E: y^2 = x^3 + \alpha \times x + \beta$$

while the element G on the elliptic curve E is arbitrarily set and expressed as $$G = (x0, y0)$$

<Transformation Coefficient Acquiring Unit 220>

Figure 3:
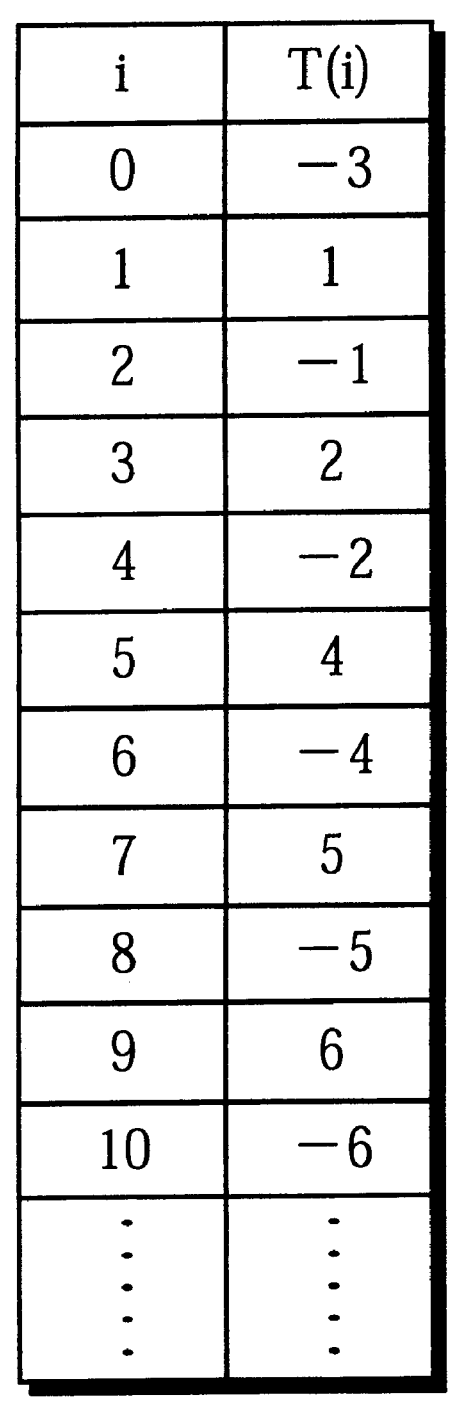

The transformation coefficient acquiring unit 220 possesses a function T(i) shown in FIG. 3. When i=0, 1, 2, 3, 4, the function T(i) holds the values −3, 1, −1, 2, −2, respectively. When i=5, 6, 7, 8, 9, 10, . . . , the function T(i) holds the values 4, −4, 5, −5, 6, −6, . . . , respectively.

Starting from i=0 and incrementing i by 1, the transformation coefficient acquiring unit 220 judges whether T(i) satisfies $$-2^{31}+1 \leq T(i) \leq 2^{31}-1 \quad \text{(Formula 24)}$$

If T(i) satisfies Formula 24, the transformation coefficient acquiring unit 220 finds a transformation coefficient t that satisfies $$T(i) = t^4 \times \alpha \pmod{p} \quad \text{(Formula 25)}$$

where t is an element on the finite field GF(p).

Note here that Formula 24 is used to limit the length of T(i) within 32 bits.

Since T(i)=−3 when i=0, the transformation coefficient acquiring unit 220 first refers to −3 as T(i). After i=0, the transformation coefficient acquiring unit 220 refers to values with increasing absolute values as T(i), since the absolute value of T(i) increases with increase of the value of i except for i=0.

<Transformed Elliptic Curve Calculating Unit 230>

The transformed elliptic curve calculating unit 230 calculates parameters α' and β' of a transformed elliptic curve Et which is formed over the finite field GF(p) and expressed as $$Et: y'^2 = x'^3 + \alpha' \times x' + \beta'$$

according to Formulas 26 and 27, respectively.

$$\alpha' = \alpha \times t^4 \quad \text{(Formula 26)}$$

$$\beta' = \beta \times t^6 \quad \text{(Formula 27)}$$

The transformed elliptic curve calculating unit 230 also calculates an element Gt=(xt0,yt0) on the transformed elliptic curve Et according to $$xt0 = t^2 \times x0 \quad \text{(Formula 28)}$$

$$yt0 = t^3 \times y0 \quad \text{(Formula 29)}$$

where the element Gt corresponds to the element G.

Consequently, a given point on the elliptic curve E is transformed into a point on the transformed elliptic curve Et which is defined by the parameters α' and β' generated above.

<Parameter Sending Unit 240>

The parameter sending unit 240 sends the parameters α' and β' of the transformed elliptic curve Et and the element Gt=(xt0,yt0) to the external device.

2. Operation of Elliptic Curve Transformation Device 200

<General Operation of Elliptic Curve Transformation Device 200 >

Figure 4:
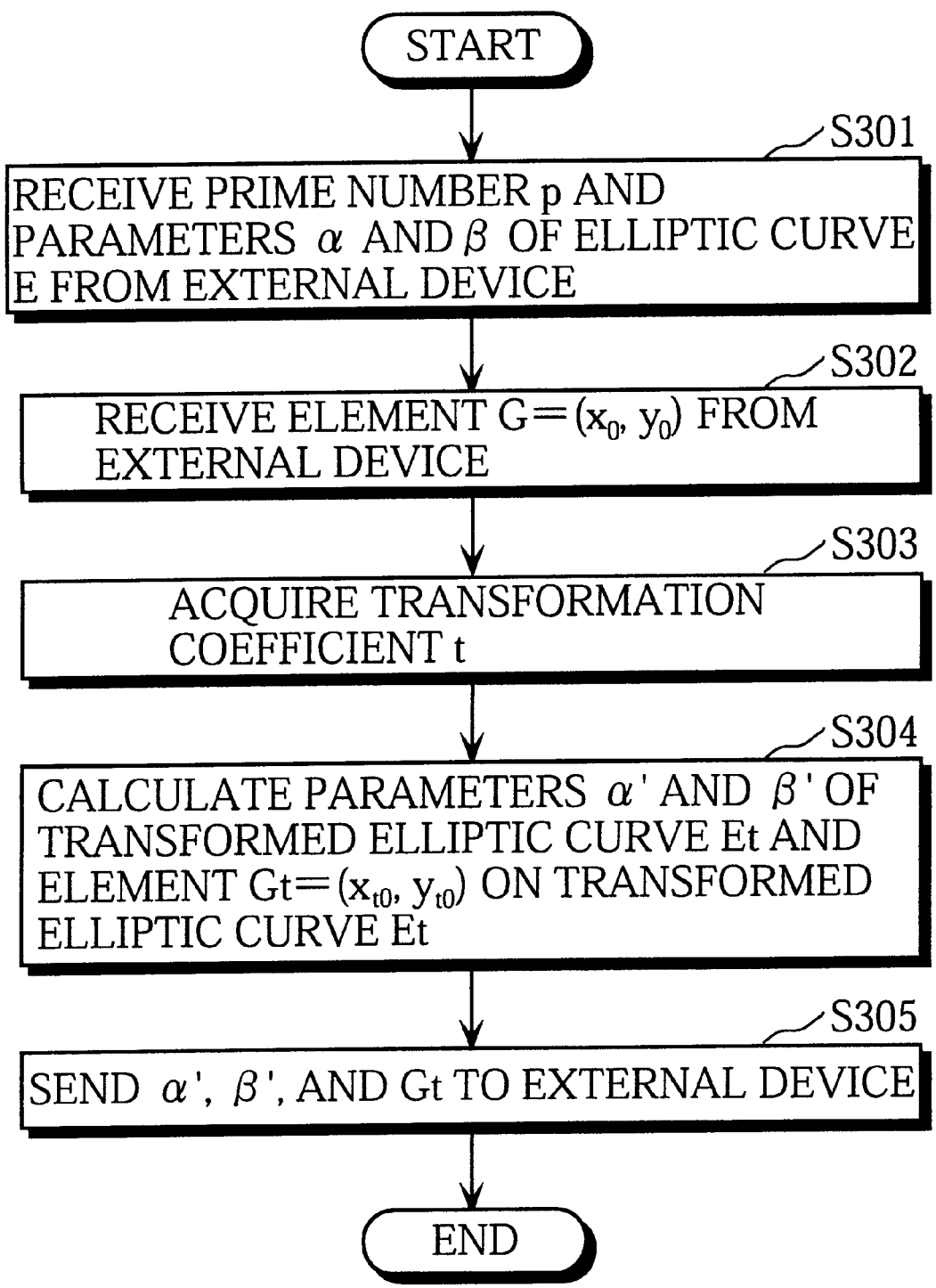
FIG. 4 is a flowchart showing the operation of the elliptic curve transformation device.

The general operation of the elliptic curve transformation device 200 will be explained below with reference to FIG. 4.

The parameter receiving unit 210 receives a prime number p, parameters α and β of an elliptic curve E, and an element G=(x0,y0) on the elliptic curve E, from an external device (steps S301 and S302). The transformation coefficient acquiring unit 220 acquires a transformation coefficient t (step S303). The transformed elliptic curve calculating unit 230 calculates parameters α' and β' of a transformed elliptic curve Et formed over a finite field GF(p), and an element Gt=(xt0,yt0) which exists on the transformed elliptic curve Et and corresponds to the element G (step S304). The parameter sending unit 240 sends the obtained parameters α' and β' and element Gt=(xt0,yt0) to the external device (step S305).

<Operation of Transformation Coefficient Acquiring Unit 220>

Figure 5:
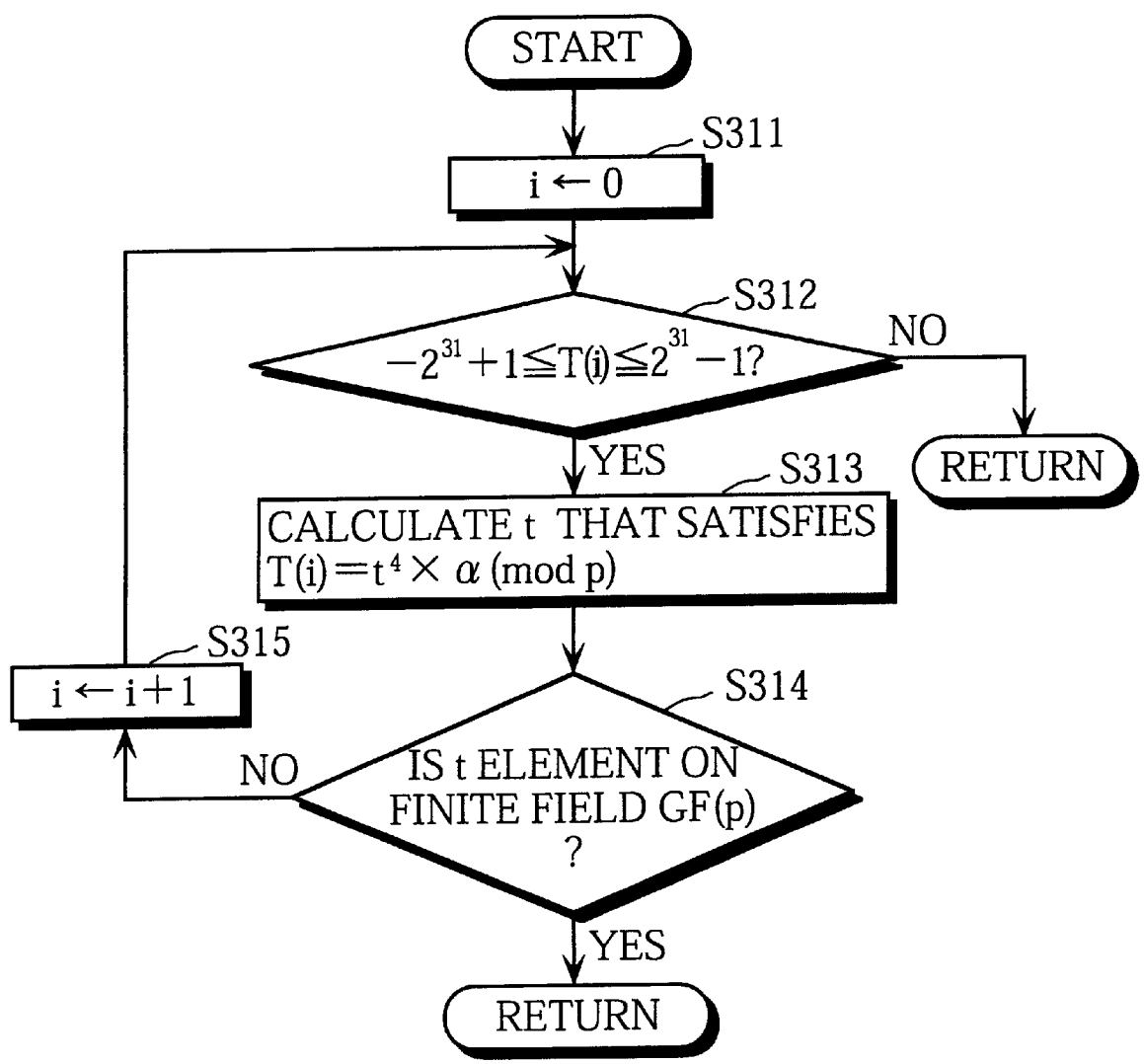
FIG. 5 is a flowchart showing the operation of a transformation coefficient acquiring unit of the elliptic curve transformation device.

The operation of the transformation coefficient acquiring unit 220 will be explained below with reference to FIG. 5.

The transformation coefficient acquiring unit 220 assigns 0 to i (step S311) and judges whether the function T(i) satisfies $$-2^{31}+1 \leq T(i) \leq 2^{31}-1$$

(step S312). If T(i) does not satisfy the above formula, the operation is complete. If T(i) satisfies the formula, the transformation coefficient acquiring unit 220 calculates a transformation coefficient t that satisfies $$T(i) = t^4 \times \alpha \pmod{p}$$

(step S313), and judges whether the obtained transformation coefficient t is an element on the finite field GF(p) (step S314). If t is an element on the finite field GF(p), the operation is complete. If, on the other hand, t is not an element on the finite field GF(p), the transformation coefficient acquiring unit 220 increments i by 1 (step S315) and returns to step S312.

<Operation of Transformed Elliptic Curve Calculating Unit 230>

Figure 6:
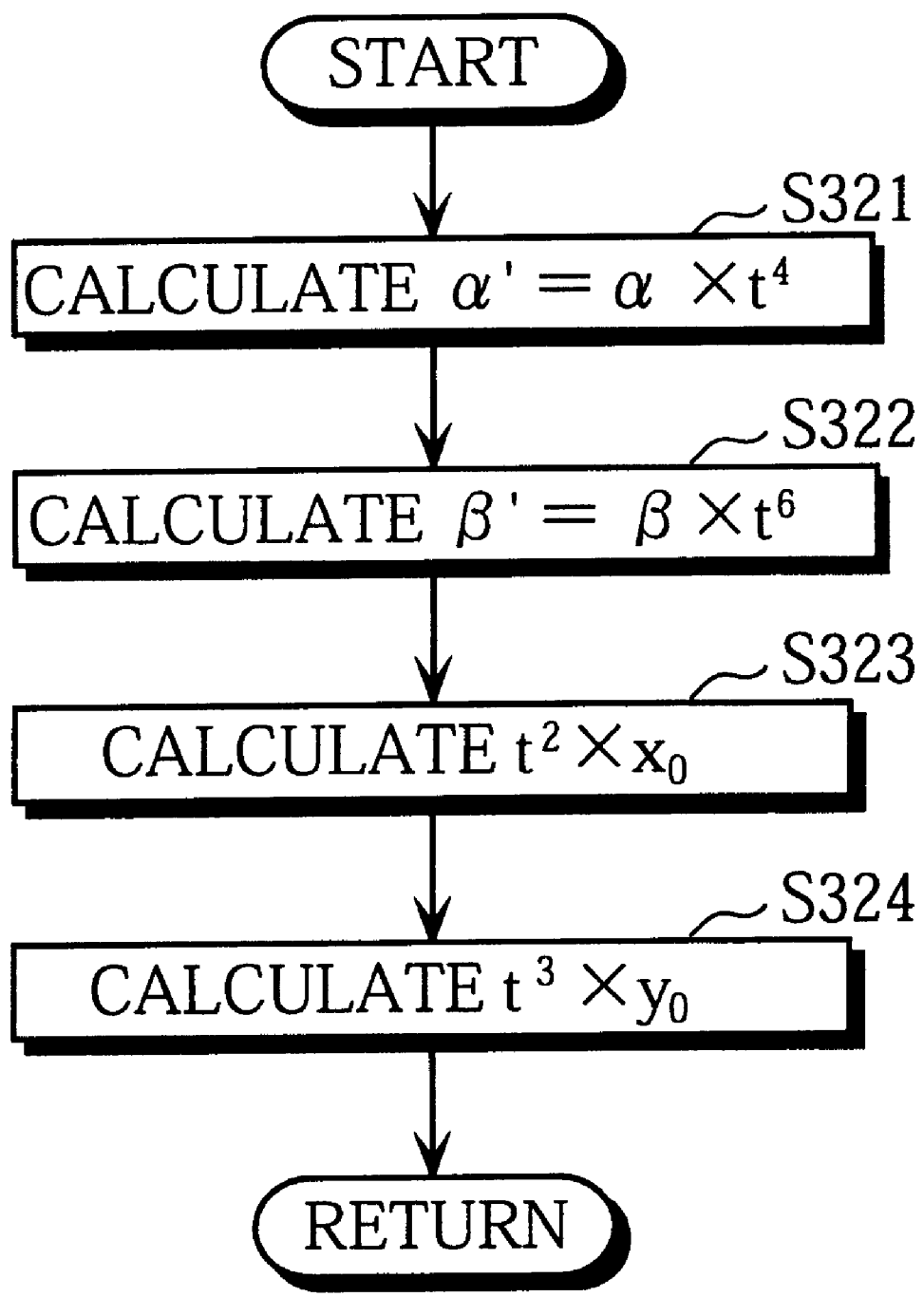
FIG. 6 is a flowchart showing the operation of a transformed elliptic curve calculating unit of the elliptic curve transformation device.

The operation of the transformed elliptic curve calculating unit 230 will be explained below with reference to FIG. 6.

The transformed elliptic curve calculating unit 230 calculates a parameter $\alpha'=\alpha \times t^4$ of a transformed elliptic curve Et formed over the finite field GF(p) (step S321) and calculates a parameter $\beta=xt^6$ of the transformed elliptic curve Et (step S322).

The transformed elliptic curve calculating unit 230 also calculates an element Gt=(xt0,yt0) that is present on the transformed elliptic curve Et and corresponds to the element G, using the formulas $xt0=t^2 \times x0$ and $yt0=t^3y0$ (steps S323 and S324).

3. Proof that Transformed Elliptic Curve Et is Isomorphic to Elliptic Curve E

A proof that the transformed elliptic curve Et: $y'^2=x'^3 \alpha \times t^4 \times x' + \beta \times t^6$ is isomorphic to the elliptic curve E: $y^2=x^3 + \alpha \times x + \beta$ will be given below. In this proof, elliptic curve computations are performed in affine coordinates.

Let P=(x0,y0) be an arbitrary point on the elliptic curve E. Here, P satisfies $$y0^2 = x0^3 + \alpha \times x0 + \beta \quad \text{(Formula 30)}$$

As a result of transforming the elliptic curve E into the elliptic curve Et, P is converted into a point $P'=(x0', y0')=(t^2 \times x0, t^3 \times y0)$.

When the both sides of Formula 30 are multiplied by $t^6$, the result will be $$t^6 \times y0^2 = t^6 \times x0^3 + t^6 \times \alpha \times x0 + t^6 \times \beta$$

which can be transformed into $$(t^3 \times y0)^2 = (t^2 \times x0)^3 + \alpha \times t^4 \times (t^2 \times x0) + \beta \times t^6$$

and into $$y0'^2 = x0'^3 + \alpha \times t^4 \times x0' + \beta \times t^6$$

which shows that the point P' is on the transformed elliptic curve Et.

Meanwhile, transformation of a point on the elliptic curve E into a point on the transformed elliptic curve Et is expressed as $$(x,y) \rightarrow (x',y') = (t^2 \times x, t^3 \times y)$$

Since t≠0, transformation of the point on the transformed elliptic curve Et into the point on the elliptic curve E which is expressed as $$(x',y') \rightarrow (x,y) = (x'/(t^2), y'/(t^3))$$

is obviously the inverse transformation of E into Et.

As is evident from the above formulas, a point on the elliptic curve E corresponds to a point on the transformed elliptic curve Et.

Next, let P=(x1,y1) and Q=(x2,y2) be two arbitrary points on the elliptic curve E where P≠Q, and R=(x3,y3) be a point defined as R=P+Q. This being so, R can be calculated as follows:

$$x3 = \{(y2-y1)/(x2-x1)\}^2 - x1 - x2$$

$$y3 = \{(y2-y1)/(x2-x1)\}(x1-x3) - y1$$

as described above.

Suppose P, Q, and R on the elliptic curve E are converted into points P'=(x1', y1'), Q'=(x2', y2'), and R'=(x3', y3') on the transformed elliptic curve Et as a result of transformation of E into Et. Here, $$x1' = t^2 \times x1$$

$$y1' = t^3 \times y1$$

$$x2' = t^2 \times x2$$

$$y2' = t^3 \times y2$$

$$x3' = t^2 \times x3$$

$$y3' = t^3 \times y3$$

are established.

Let R"=(x3",y3") be a point defined as R"=P'+Q' that is an addition operation performed on the transformed elliptic curve Et. The point R" can be calculated as follows:

$$x3'' = \{(y2'-y1')/(x2'-x1')\}^2 - x1' - x2'$$

$$y3'' = \{(y2'-y1')/(x2'-x1')\}(x1'-x3') - y1'$$

When x1', y1', x2' and y2' in these formulas are expressed using x1, y1, x2 and y2, $$x3'' = \{(t^3 \times y2 - t^3 \times y1)/(t^2 \times x2 - t^2 \times x1)\}^2 -$$
$$\quad t^2 \times x1 - t^2 \times x2$$
$$= \{t(y2-y1)/(x2-x1)\}^2 - t^2 \times x1 - t^2 \times x2$$
$$= t^2 \times \{((y2-y1)/(x2-x1))^2 - x1 - x2\}$$
$$= t^2 \times x3$$
$$= x3'$$

while $$y3'' = \{(t^3 \times y2 - t^3 \times y1)/(t^2 \times x2 - t^2 \times x1)\} \times$$
$$\quad (t^2 \times x1 - t^2 \times x3) - t^3 \times y1\}$$
$$= \{t(y2-y1)/(x2-x1)\} \times t^2(x1-x3) - t^3 \times y1$$
$$= t^3 \times \{((y2-y1)/(x2-x1)) \times (x1-x3) - y1\}$$
$$= t^3 \times y3$$
$$= y3'$$

Accordingly, R' and R" are equivalent.

The validity of the addition formulas for the transformed elliptic curve is thereby verified.

Also, the validity of the doubling formulas for the transformed elliptic curve where Q=P can be checked as follows.

Let P=(x1,y1) be an arbitrary point on the elliptic curve E and R=(x3,y3) be a point defined as R=P+P. When P and R are converted respectively into points P'=(x1',y1') and R'=(x3',y3') on the transformed elliptic curve Et as a result of elliptic curve transformation, $$x1' = t^2 \times x1$$

$$y1' = t^3 \times y1$$

$$x3' = t^2 \times x3$$

$$y3' = t^3 \times y3$$

are established.

Let R"=(x3",y3") be a point defined as R"=P'+P' that is a doubling operation performed on the transformed elliptic curve Et. Here, R" can be calculated as follows:

$$x3''=\{(3x1'^2+\alpha)/2y1'\}^2-2x1'$$

$$y3''=\{(3x1'^2+\alpha)/2y1'\}(x1'-x3')-y1'$$

When x1'and y1'in these formulas are expressed using x1and y1, $$x3'' = \{\{(t^2 \times 3x1)^2 + \alpha\}/(2 \times t^3 \times y1)\}^2 -$$

$$2 \times t^2 \times x1$$

$$= t^2\{(3x1^2+\alpha)/y1\}^2 - t^2 \times 2x1$$

$$= t^2\{\{(3x1^2+\alpha)/y1\}^2 - 2x1\}$$

$$= t^2 \times x3$$

$$= \{t(y2-y1)/(x2-x1)\}^2 - t^2 \times x1 - t^2 \times x2$$

$$= t^2\{\{(y2-y1)/(x2-x1)\}^2 - x1 - x2\}$$

$$= t^2 \times x3$$

$$= x3'$$

while $$y3'' = \{\{(t^2 \times 3x1)^2 + \alpha\}/(2 \times t^3 \times y1)\} \times$$

$$(t^2 \times x1 - t^2 \times x3) - t^3 \times y1$$

$$= t^3\{(3x1^2+\alpha)/2y1\}(x1-x3) - t^3 \times y1$$

$$= t^3\{\{(3x1^2+\alpha)/2y1\}(x1-x3) - y1\}$$

$$= t^3 \times y3$$

$$= y3'$$

Accordingly, R' and R" are equivalent.

The validity of the doubling formulas for the transformed elliptic curve is thereby verified.

Hence it is proved that the transformed elliptic curve Et is isomorphic to the elliptic curve E.

4. Evaluation of Computational Complexity for Transformed Elliptic Curve Et

With the above embodiment, the parameter $\alpha'$ of the transformed elliptic curve Et is set at 32 bits or less, so that computational complexity of Formula 18 is reduced to 3Sq. As a result, computational complexity of an addition operation over the transformed elliptic curve Et becomes 12Mul+4Sq and computational complexity of a doubling operation over the transformed elliptic curve Et becomes 3Mul+6Sq. When compared with the elliptic curve E whose parameter $\alpha$ is approximately 160 bits long, the computational complexity of the doubling is reduced by 1 Mul.

Such reduction in computational complexity is achieved due to the following reason. Since the absolute value of T(i) increases with increase of the value of i except when i=0, values with smaller absolute values are first referred to as T(i). Accordingly, it is possible to select an appropriate elliptic curve with less computational complexity.

Also, when the parameter $\alpha'$ of the transformed elliptic curve Et is −3, Formula 18 can be transformed as $$M = 3 \times X1^2 + \alpha' \times Z1^4$$

$$= 3 \times X1^2 - 3 \times Z1^4$$

$$= 3 \times (X1 + Z1^2) \times (X1 - Z1^2)$$

As a result, computational complexity of Formula 18 becomes 1 Mul+1 Sq, so that computational complexity of addition and doubling operations is estimated respectively as 12Mul+4Sq and 4Mul+4Sq. Thus, the computational complexity of the doubling can be reduced by 2Sq when compared with conventional techniques.

In the present embodiment, the transformation coefficient acquiring unit 220 refers to T(i) starting from i=0 and incrementing i by 1, so that −3 is initially referred to as T(i). Accordingly, an elliptic curve which reduces computational complexity of the doubling by 2 Sq compared to the conventional techniques is checked first, with it being possible to raise the possibility of selecting an optimal transformed elliptic curve by a single operation.

Consequently, through use of the transformed elliptic curve obtained by the elliptic curve transformation device 200, it is possible to speed up elliptic curve computations.

5. Variants

The transformation coefficient acquiring unit 220 may determine a transformation coefficient t as follows.

The transformation coefficient acquiring unit 220 includes a random number generating unit which randomly generates an element u(u≠0) on the finite field GF(p). The transformation coefficient acquiring unit 220 then judges whether the element u satisfies $$-2^31+1 \leq u^4 \times \alpha(\bmod p) \leq 2^31-1 \quad \text{(Formula 31)}$$

If u satisfies Formula 31, u is adopted as the transformation coefficient t. If, on the other hand, u does not satisfy Formula 31, the random number generating unit randomly generates an element u again and the transformation coefficient acquiring unit 220 judges whether the newly generated element u satisfies Formula 31.

The transformation coefficient acquiring unit 220 repeats the above element generation and judgement until an element u that satisfies Formula 31 is found.

Here, the transformation coefficient acquiring unit 220 may use $$u^4 \times \alpha(\bmod p) = -3 \quad \text{(Formula 32)}$$

instead of Formula 31.

6. Applications of Elliptic Curve Transformation Device 200

Figure 7:
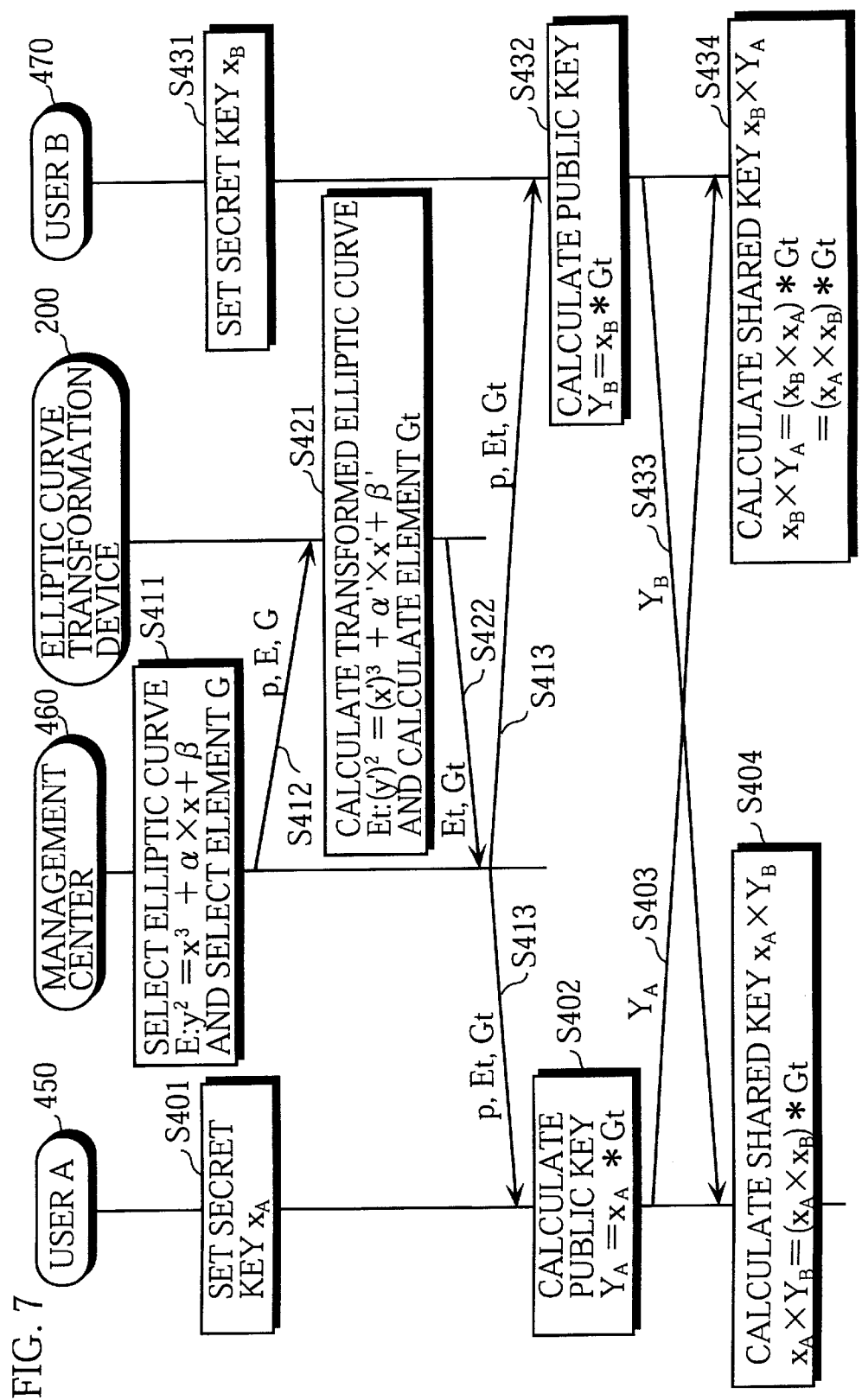
FIG. 7 is a sequence diagram showing the procedure of a key agreement system that uses the elliptic curve transformation device.

A key agreement system that uses the above elliptic curve transformation device 200 will be described below with reference to FIG. 7.

In the figure, a user A 450, a management center 460 and a user B 470 are connected together via a network.

(1) Selection of Elliptic Curve by Management Center 460

The management center 460 selects a prime number p, selects an elliptic curve E on a finite field GF(p), sets G as a base point of E, and sets q as the order of E (step S411). Here, q is the smallest positive integer that satisfies Formula 2

$$q*G=0$$

while E and G are expressed respectively as $$E: y^2=x^3+\alpha \times x+\beta$$

$$G=(x0,y0)$$

The management center 460 sends p, E and G to the elliptic curve transformation device 200 (step S412).

(2) Generation of Transformed Elliptic Curve by Elliptic Curve Transformation Device 200

The elliptic curve transformation device 200 calculates a transformed elliptic curve Et and an element Gt as follows:

$Et: y'^2 = x'^3 + \alpha' \times x' + \beta'$ $\alpha' = \alpha \times t^4$ $\beta' = \beta \times t^6$ $Gt = (xt0, yt0)$ $xt0 = t^2 \times x0$ $yt0 = t^3 \times y0$ (step 421).

The elliptic curve transformation device 200 then sends Et and Gt to the management center 460 (step S422).

(3) Setting of Secret keys and Generation of Public Keys by Users

The management center 460 reveals the prime number p, the elliptic curve Et and the element Gt to the user A 450 and the user B 470 (step S413).

The user A 450 sets a secret key xA (step S401), and the user B 470 sets a secret key xB (step S431).

The user A 450 calculates a public key YA according to $YA = xA * Gt$ (step 3402) and sends the public key YA to the user B 470 (step S403).

Similarly, the user B 470 calculates a public key YB according to $YB = xB * G$ (step S432) and sends the public key YB to the user A 450 (step S433).

(4) Generation of Shared Keys by Users

The user A 450 calculates a shared key XA*YB (step S404), and the user B 470 calculates a shared key XB*YA (step S434).

The shared key xA*YB generated by the user A 450 can be transformed as $xA*YB = (xA \times xB)*Gt$ while the shared key XB*YA generated by the user B 470 can be transformed as $xB*YA = (xB \times xA)*Gt = (xA \times xB)*Gt$ As is evident from the above formulas, the shared key xA*YB generated by the user A 450 and the shared key xB*YA generated by by the user B 470 are the same.

7. Other Variants

Other embodiments of the present invention include an elliptic curve transformation method that achieves the elliptic curve transformation described above, and a computer-readable storage medium storing an elliptic curve transformation program for implementing the elliptic curve transformation method on a computer. The elliptic curve transformation program may also be transmitted to the computer via a communication line.

Also, the elliptic curve transformation device can be applied to an encryption system that includes at least one of an encryption device and a decryption device.

The elliptic curve transformation device can also be applied to a digital signature system that includes at least one of a digital signature device and a digital signature verification device.

Also, an encryption device, a decryption device, a digital signature device, a digital signature verification device or a key agreement device may store parameters α' and β' and an element Gt of an elliptic curve generated by the elliptic curve transformation device beforehand, so that encryption, decryption, digital signature, digital signature verification or key agreement can be performed using the parameters α' and β' and the element Gt.

Various combinations of the embodiments and variants stated above are possible.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An elliptic curve transformation device for transforming an elliptic curve E into an elliptic curve Et that is utilized in encryption or decryption whose security is based on a discrete logarithm problem, the elliptic curve E being expressed as $y^2 = x^3 + \alpha \times x + \beta$ and defined over a finite field GF (p), p being a prime number, α being a parameter of the elliptic curve E, and β being a parameter of the elliptic curve E, the elliptic curve transformation device comprising:

receiving means for receiving an element G as a base point, the prime number p, the parameter α, and the parameter β from an external device, the element G existing on the elliptic curve E and being expressed as $G = (x_0, y_0)$;

transformation coefficient acquiring means for acquiring a transformation coefficient t that is present on the finite field GF (p), where t≈ and a number of digits of $t^4 \times \alpha \pmod{p}$ is smaller than a number of digits of the prime number p;

elliptic curve calculating means for calculating a parameter α' and a parameter β of the elliptic curve Et and an element Gt that is a new base point and is expressed as $Gt = (x_{t0}, y_{t0})$, using the transformation coefficient t according to $a' = \alpha \times t^4 \pmod{p}$ $\alpha' = \alpha \times t^6 \pmod{p}$ $x_{t0} = t^2 \times x_0 \pmod{p}$ $y_{t0} = t^3 \times y_0 \pmod{p}$ where the elliptic curve Et is expressed as $(y')^2 = (x')^3 + \alpha' \times x' + \beta'$ and defined over the finite field GF (p); and outputting means for outputting the parameter α', the parameter β' and the element Gt to the external device.

2. The elliptic curve transformation device of claim 1, wherein the prime number p is 160 bits long, and wherein the transformation coefficient acquiring means acquires the transformation coefficient t which satisfies a condition that $t^4 \times \alpha \pmod{p}$ is no longer than 32 bits.

3. The elliptic curve transformation device of claim 1, wherein the information coefficient acquiring means acquires the transformation coefficient t which satisfies $t^4 \times \alpha \pmod{p} = -3$.

4. The elliptic curve transformation device of claim 1,
wherein the transformation coefficient acquiring means acquires the transformation coefficient t by repeating:
assignment of a value to a variable T, wherein −3 is first assigned as an initial value and then values with increasing absolute values are assigned; and
judgement on whether $$T = t^4 \times \alpha \pmod{p}$$

is satisfied.

5. An elliptic curve utilization system whereby an elliptic curve transformation device transforms an elliptic curve E into an elliptic curve Et and a utilization device uses the elliptic curve Et generated by the elliptic curve transformation device,
the elliptic curve E being expressed as $$y^2 = x^3 + \alpha \times x + \beta$$

and defined over a finite field GF (p),
p being a prime number,
$\alpha$ being a parameter of the elliptic curve E, and
$\beta$ being a parameter of the elliptic curve E,
wherein the utilization device includes first outputting means, first receiving means and utilizing means, while the elliptic curve transformation device includes second receiving means, transformation coefficient acquiring means, elliptic curve calculating means and second outputting means,
wherein the fist outputting means outputs an element G as a base point, the prime number p, the parameter $\alpha$ and the parameter $\beta$ to the elliptic curve transformation device, the element G existing on the elliptic curve E and being expressed as $G=(x_0, y_0)$,
wherein the second receiving means receives the prime number p, the parameter $\alpha$, the parameter $\beta$ and the element G from the utilization device,
wherein the transformation coefficient acquiring means acquires a transformation coefficient t that is present on the finite field GF (p), where t≈ and a number of digits of $t^4 \times \alpha \pmod{p}$ is smaller than a number of digits of the prime number p,
wherein the elliptic curve calculating means calculates a parameter $\alpha'$ and a parameter $\beta$ of the elliptic curve Et and an element at that is a new base point and is expressed as $Gt=(x_{t0}, y_{t0})$, using the transformation coefficient t according to $$\alpha' = \alpha \times t^4 \pmod{p}$$
$$\beta' = \beta \times t^4 \pmod{6}$$
$$x_{t0} = t^2 \times x_0 \pmod{p}$$
$$y_{t0} = t^3 \times y_0 \pmod{p}$$

where the elliptic curve Et is expressed as $$(y^1)^2 = (x')^3 + \alpha' \times x' + \beta'$$

and defined over the finite field GF (p),
wherein the second outputting means outputs the parameter $\alpha'$, the parameter $\beta$ and the element Gt to the utilization device,
wherein the first receiving means receives the parameter $\alpha'$, the parameter $\beta$ and the element Gt from the elliptic curve transformation device, and
wherein the utilizing means performs one of encryption, decryption, digital signature, digital signature verification, and key agreement using a discrete logarithm problem as a basis for security, by performing calculations on the elliptic curve Et using the prime number p, the elliptic curve Et defined by the parameter $\alpha'$ and the parameters $\beta'$ over the finite field GF (p), and the element Gt as the base point.

6. The elliptic curve utilization system of claim 5,
wherein the prime number p is 160 bits long, and
wherein the transformation coefficient acquiring means acquires the transformation coefficient t which satisfies a condition that $t^4 \times \alpha \pmod{p}$ is no longer than 32 bits.

7. The elliptic curve utilization system of claim 5,
wherein the transformation coefficient acquiring means acquires the transformation coefficient t which satisfies $t^4 \times \alpha \pmod{p} = -3$.

8. The elliptic curve utilization system of claim 5,
wherein the transformation coefficient acquiring means acquires the transformation coefficient t by repeating:
assignment of a value to a variable T, wherein −3 is first assigned as an initial value and then values with increasing absolute values are assigned; and
judgement on whether
$T = t^4 \times \alpha \pmod{p}$
is satisfied.

9. A utilization device for receiving, from an elliptic curve transformation device that includes second receiving means, transformation coefficient acquiring means, elliptic curve calculating means and second outputting means and transforms an elliptic curve E into an elliptic curve Et, the elliptic curve Et and using the received elliptic curve Et,
the elliptic curve E being expressed as $$y^2 = x^3 + \alpha \times x + \beta$$

and defined over a finite field GF (p),
p being a prime number,
$\alpha$ being a parameter of the elliptic curve E, and
$\beta$ being a parameter of the elliptic curve E,
the utilization device comprising
first outputting means, first receiving means, and utilizing means,
wherein the first outputting means outputs an element C as a base point, the prime number p, the parameter $\alpha$ and the parameter $\beta$ to the elliptic curve transformation device, the element G existing on the elliptic curve E and being expressed as $G=(x_0, y_0)$,
wherein the second receiving means receives the prime number p, the parameter $\alpha$, the parameter $\beta$ and the element G from the utilization device,
wherein the transformation coefficient acquiring means acquires a transformation coefficient t that is present on the finite field GF (p), where to and a number of digits of $t^4 \times \alpha \pmod{p}$ is smaller than a number of digits of the prime number p,
wherein the elliptic curve calculating means calculates a parameter $\alpha'$ and a parameter $\beta'$ of the elliptic curve Et and an element Gt that is a new base point and is expressed as $Gt=(x_{t0}, y_{t0})$, using the transformation coefficient t according to $$\alpha'=\alpha \times t^4 \pmod{p}$$

$$\beta'=\beta \times t^6 \pmod{p}$$

$$x_{t0}=t^2 \times x_0 \pmod{p}$$

$$y_{t0}=t^3 \times y_0 \pmod{p}$$

where the elliptic curve Et is expressed as $$(y')^2=(x')^3+\alpha' \times x'+\beta'$$

and defined over the finite field GF (p),
wherein the second outputting means outputs the parameter $\alpha'$, the parameter $\beta'$ and the element Gt to the utilization device,
wherein the first receiving means receives the parameter $\alpha'$, the parameter $\beta'$ and the element Gt from the elliptic curve transformation device, and
wherein the utilizing means performs one of encryption, decryption, digital signature, digital signature verification, and key agreement using a discrete logarithm problem as a basis for security, by performing calculations on the elliptic curve Et using the prime number p, the elliptic curve Et defined by the parameter $\alpha'$ and the parameter $\beta'$ over the finite field GF (p), and the element Gt as the base point.

10. A utilization device for using an elliptic curve Et which is generated as a result of transformation of an elliptic curve E, comprising:
storing means for storing an element Gt as a base point, a parameter $\alpha'$ of the elliptic curve Et, and a parameter $\beta'$ of the elliptic curve Et; and
utilizing means for performing one of encryption, decryption, digital signature, digital signature verification, and key agreement using a discrete logarithm problem as a basis for security, by performing calculations on the elliptic curve Et using a prime number p, the elliptic curve Et defined by the parameter $\alpha'$ and the parameter $\beta'$ over a finite field GF (p), and the element Gt as the base point,
wherein the parameter $\alpha'$, the parameter $\beta$ and the element Gt are generated by an elliptic curve transformation device that includes transformation coefficient acquiring means and elliptic curve calculating means,
wherein the elliptic curve E is expressed as $$y^2=x^3+\alpha \times x\beta$$

and defined over the finite field GF (p), while G as a base point is an element on the elliptic curve E and is expressed as $G=(x_0, y_0)$,
wherein the transformation coefficient acquiring means acquires a transformation coefficient t that is present on the finite field GF (p), where $t \approx 0$ and a number of digits of $t^4 \times \alpha \pmod{p}$ is smaller than a number of digits of the prime number p, and
wherein the elliptic curve calculating means calculates the parameter $\alpha'$, the parameter $\beta'$ and the element Gt which is present on the elliptic curve Et and is expressed as $Gt=(x_{t0}, y_{t0})$, using the transformation coefficient t according to $$\alpha'=\alpha \times t^4 \pmod{p}$$

$$\beta'=\beta \times t^6 \pmod{p}$$

$$x_{t0}=t^2 \times y_0 \pmod{p}$$

$$y_{t0}=t^3 \times y_0 \pmod{p}$$

wherein the elliptic curve Et is expressed as $$(y')^2=(x')^3+\alpha' \times x'+\beta'$$

and defined over the finite field GP (p).

11. An elliptic curve transformation method for transforming an elliptic curve E into an elliptic curve Et that is utilized in encryption or decryption whose security is based on a discrete logarithm problem the elliptic curve E being expressed as $$y^2=x^2+\alpha \times x+\beta$$

and defined over a finite field GF (p),
p being a prime number,
$\alpha$ being a parameter of the elliptic curve E, and
$\beta$ being a parameter of the elliptic curve E,
the elliptic curve transformation method comprising:
a receiving step for receiving an element G as a base point, the prime number p, the parameter $\alpha$, and the parameter $\beta$ from an external device, the element G existing on the elliptic curve sand being expressed as $G=(x_0, y_0)$;
a transformation coefficient acquiring step for acquiring a transformation coefficient t that is present on the finite field GF (p), where $t \approx 0$ and a number of digits of $t^4 \times \alpha \pmod{p}$ is smaller than a number of digits of the prime number p;
an elliptic curve calculating step for calculating a parameter a' and a parameter $\beta'$ of the elliptic curve Et and an element Gt that is a new base point and is expressed as $Gt=(x_{t0}, y_{t0})$, using the transformation coefficient t according to $$\alpha'=\alpha \times t^4 \pmod{p}$$

$$\beta'=\beta \times t^6 \pmod{p}$$

$$x_{t0}=t^2 \times x_0 \pmod{p}$$

$$y_{t0}=t^3 \times y_0 \pmod{p}$$

where the elliptic curve Et is expressed as $$(y')^2=(x')^3+\alpha' \times x'+\beta'$$

and defined over the finite field GF (p); and
an outputting step for outputting the parameter $\alpha'$, the parameter $\beta'$ and the element Gt to the external device.

12. A computer-readable storage medium storing an elliptic curve transformation program for transforming an elliptic curve E into an elliptic curve Et that is utilized in encryption or decryption whose security is based on a discrete logarithm problem,
the elliptic curve E being expressed as $$y^2=x^3+\alpha \times x+\beta$$

and defined over a finite field GF (p),
p being a prime number,
$\alpha$ being a parameter of the elliptic curve E, and
$\beta$ being a parameter of the elliptic curve E,
the elliptic curve transformation program comprising:
a receiving step for receiving an element G as a base point, the prime number p, the parameter $\alpha$, and the parameter β from an external device, the element G existing on the elliptic curve E and being expressed as $G=(x_0, y_0)$;

a transformation coefficient acquiring step for acquiring a transformation coefficient t that is present on the finite field GF (p), where t≉0 and a number of digits of $t^4 \times \alpha \pmod p$ is smaller than a number of digits of the prime number p;

an elliptic curve calculating step for calculating a parameter α' and a parameter β' of the elliptic curve Et and an element Gt that is a new base point and is expressed as $Gt=(x_{t0}, y_{t0})$ using the transformation coefficient t according to $$\alpha'=\alpha \times t^4 \pmod p$$
$$\beta'=\beta \times t^6 \pmod p$$
$$x_{t0}=t^2 \times x_0 \pmod p$$
$$y_{t0}=t^3 \times y_0 \pmod p$$

where the elliptic curve Et is expressed as $$(y')^2=(x')^3+\alpha' \times x'+\beta'$$

and defined over the finite field GF (p); and an outputting step for outputting the parameter α', the parameter β' and the element Gt to the external device.

13. An elliptic curve transformation device for transforming an elliptic curve E into an elliptic curve Et which is utilized in encryption or decryption whose security is based on a discrete logarithm problem, the elliptic curve transformation device being implemented on a computer system equipped with a microprocessor, the elliptic curve E being expressed as $$y^2=x^3+\alpha \times x+\beta$$

and defined over a-finite field GF (p), p being a prime number,

α being a parameter of the elliptic curve E, and

β being a parameter of the elliptic curve E, the elliptic curve transformation device comprising:

receiving means for receiving an element G as a base point, the prime number p, the parameter α, and the parameter β from an external device, the element G existing on the elliptic curve E and being expressed as $G=(x_0,y_0)$;

transformation coefficient acquiring means for acquiring a transformation coefficient t that is present on the finite field GF (p), where t≉0 and a number of digits of $t^4 \times \alpha \pmod p$ is smaller than a number of digits of the prime number p;

elliptic curve calculating means for calculating a parameter α' and a parameter β' of the elliptic curve Et and an element Gt that is a new base point and is expressed as $Gt=(x_{t0}, y_{t0})$, using the transformation coefficient t according to $$\alpha'=\alpha \times t^4 \pmod p$$
$$\beta'=\beta \times t^6 \pmod p$$
$$x_{t0}=t^2 \times x_0 \pmod p$$
$$y_{t0}=t^3 \times y_0 \pmod p$$

where the elliptic curve Et is expressed as $$(y')^2=(x')^3+\alpha' \times x'+\beta'$$

and defined over the finite field GF (p); and outputting means for outputting the parameter α', the parameter β' and the element Gt to the external device.

14. The elliptic curve transformation device of claim 13, wherein the prime number p is 160 bits long, and wherein the transformation coefficient acquiring means acquires the transformation coefficient t which satisfies a condition that $t^4 \times \alpha \pmod p$ is no longer tan 32 bits.

15. The elliptic curve transformation device of claim 13, wherein the transformation coefficient acquiring means acquires the transformation coefficient t which satisfies $t^4 \times \alpha \pmod p = -3$.

16. The elliptic curve transformation device of claim 13, wherein the transformation coefficient acquiring means acquires the transformation coefficient t by repeating:

assignment of a value to a variable T, wherein −3 is first assigned as an initial value and then values with increasing absolute values are assigned; and judgement on whether $$T=t4 \times \alpha \pmod p$$

is satisfied.

* * * * *

UNITED STATES PATENT AND TRADEMARK OFFICE
CERTIFICATE OF CORRECTION

PATENT NO. : 6,212,277 B1
DATED : April 3, 2001
INVENTOR(S) : Atsuko Miyaji

It is certified that error appears in the above-identified patent and that said Letters Patent is hereby corrected as shown below:

Column 3,
Line 10, delete "y^2=x^3+α×xβ" and insert -- y^2=x^3+α×x+β --.
Line 27, delete "x3= {(3x1^2+α)/2y1}2-2x1" and insert
-- x3= {(3x1^2+α)/2y1}^2-2x1 --.
Line 28, delete "y3={(3x1^2+α)2y1}(x1-x3)-yl" and insert
-- y3={(3x1^2+α)/2y1}(x-1-x3)-y1 --.

Column 6,
Line 8, delete "(Condition 2) #E(GF(p))-(p+1)≈0,-1" and insert
-- (Condition 2) #E(GF(p))-(p+1)≠0,-1 --.
Line 64, delete "t≈0" and insert -- t≠0 --.
Line 67, delete "β" and insert -- β' --.

Column 7,
Line 64, delete "Cr" and insert -- α --.
Line 67, delete "t≈0" and insert -- t≠0 --.

Column 8,
Line 3, delete "β" and insert -- β' --.
Line 15, delete "yt0=t^3xy0" and insert -- yt0=t^3×y0 --.

Column 11,
Line 15, delete "β=×t^6" and insert -- β'=β×t^6 --.
Line 20, delete "yt0=t^3y0" and insert -- yt0=t^3×y0 --.
Lines 24-25, delete "Et=y'^2=x'^3α×t^4×x'+β×t^6" and insert
-- Et=y'^2=x'^3+α×t^4×x'+β×t^6 --.
Line 54, delete "t≈0" and insert -- t≠0 --.

Column 14,
Line 21, delete "u(u≈0)" and insert -- u(u≠0) --.

Column 16,
Line 37, delete "t≈" and insert -- t≠0 --.
Line 41, delete "β" and insert -- β' --.
Line 45, delete "a'=α×t^4(mod p)" and insert -- α'=α×t^4(mod p) --.
Line 46, delete "α'=α×t^6(mod p)" and insert -- β'=β×t^6(mod p) --.
Line 65, delete "information" and insert -- transformation --.

UNITED STATES PATENT AND TRADEMARK OFFICE
CERTIFICATE OF CORRECTION

PATENT NO.     : 6,212,277 B1
DATED          : April 3, 2001
INVENTOR(S)    : Atsuko Miyaji It is certified that error appears in the above-identified patent and that said Letters Patent is hereby corrected as shown below:

Column 17,
Line 43, delete "t≈" and insert -- t≠0 --.

Signed and Sealed this

Twenty-third Day of November, 2004

JON W. DUDAS
*Director of the United States Patent and Trademark Office*